MULTIAPERTURE CORE MEMORY SYSTEM

Filed Jan. 8, 1962 3 Sheets-Sheet 1

INVENTOR
ELVIN L. WOODS
BY HIS ATTORNEYS
HARRIS, KIECH, RUSSELL & KERN

MULTIAPERTURE CORE MEMORY SYSTEM

Filed Jan. 8, 1962 3 Sheets-Sheet 2

INVENTOR
ELVIN L. WOODS
BY HIS ATTORNEYS
HARRIS, KIECH, RUSSELL & KERN

INVENTOR
ELVIN L. WOODS
BY HIS ATTORNEYS
HARRIS, KIECH, RUSSELL & KERN

United States Patent Office 3,238,517
Patented Mar. 1, 1966

3,238,517
MULTIAPERTURE CORE MEMORY SYSTEM

Elvin L. Woods, Tustin, Calif., assignor, by mesne assignments, to Raytheon Company, a corporation of Delaware Filed Jan. 8, 1962, Ser. No. 164,837
11 Claims. (Cl. 340—174)

This invention relates to magnetic memory elements and arrays of elements and, in particular, to a one core per bit memory system and a memory element for use therein.

Binary memory systems having bipolar output using toroid cores are known and are suitable for use in word oriented or linear select arrays and the like. These systems suffer from a number of disadvantages including wiring and assembly problems, relatively large space requirements, and complex electrical noise and shielding considerations. A particular disadvantage is the requirement of two cores per bit of storage capacity.

It is an object of the present invention to provide a one core per bit memory system which may be used in word oriented or linear select arrays and which will provide a bipolar output. A further object is to provide such a system which is easily assembled and wired, which is extremely rugged and compact, and which may easily utilize special winding patterns for noise consideration and special mechanical arrangements for shielding and temperature control considerations.

It is an object of the invention to provide a magnetic memory element as well as an array incorporating a plurality of such elements, in which each element includes a single core having two openings therethrough disposed substantially at right angles to each other with one opening providing for word writing and reading and the other opening providing for bit plane writing and output sensing. A further object is to provide a method of operating such an element utilizing bipolar inputs and achieving bipolar outputs with one core per bit storage.

It is a particular object to provide a magnetic memory element including a block of magnetic material having first and second nonparallel openings therethrough, with substantially no magnetic material between said openings, and with said openings disposed relative to each other to provide a separate flux path about each opening not coupling the other opening and two alternate flux paths each about both openings and sharing common magnetic material with the separate paths, means for producing coincident or concurrent write current pulses of predetermined polarities in the first and second openings to produce a net residual magnetic flux in a selected one of the alternate paths corresponding to the bit of information being stored, means for producing a read current pulse in the first opening of opposite polarity to the first opening write current pulse to cancel the alternate path residual flux and produce a residual magnetic flux in the separate flux path about the first opening and flux change in the separate flux path about the second opening, and means for detecting flux changes occurring about the second opening during the read current pulse with the polarity of flux change corresponding to the stored information. A further object is to provide such an element in which the block of magnetic material has first and second intersecting, orthogonally disposed openings therethrough with conductors in each of the openings.

It is an object of the invention to provide a memory system incorporating a plurality of such memory elements arranged in a word oriented array with the cores comprising the bits of a word disposed with the word openings thereof aligned for straight-through wiring and with the cores comprising a bit plane disposed in parallel rows with the bit openings of the cores of each row aligned for straight-through wiring. A further object is to provire such a system in which the cores comprising an array may be assembled closely adjacent or in contact with each other to provide a compact and rugged unit. Another object is to provide such a structure in which metal plates may be disposed between planes of cores for one or more orientations to provide shielding and thermal control as desired.

It is a particular object of the invention to provide such a memory system in which the cores may be arranged in an array and wired to provide balanced windings and to minimize the effects of stray fields and interwinding coupling. A further object is to provide such a system in which single or multiturn windings may be used as desired.

Other objects, advantages, features and results of the invention will more fully appear in the course of the following description. The drawings merely show and the description merely describes preferred embodiments of the present invention which are given by way of illustration or example.

Figure 1:
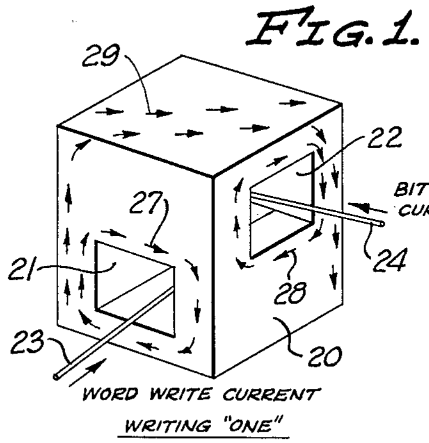
FIGS. 1, 2 and 3 illustrate the construction and operation of a preferred form of magnetic memory element.
Figure 2:
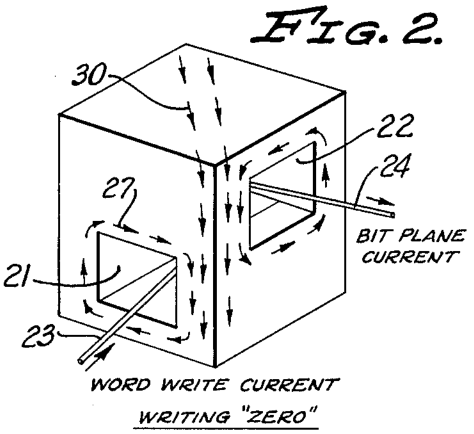
Figure 3:
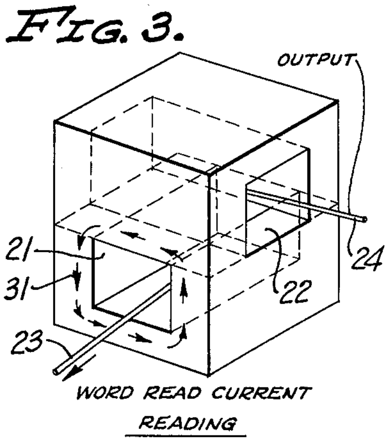

The individual memory element, as seen in FIGS. 1, 2, and 3, includes a block 20 of magnetic material having openings 21, 22 therethrough. The lower opening 21 will be referred to as the word opening and the upper opening 22 will be referred to as the bit opening. A conductor 23 is positioned in the word opening 21 and another conductor 24 is positioned in the bit opening 22.

The shape of the block 20 is not critical and the openings are disposed relative to each other such that their axes are nonparallel. Then a current through an opening can produce a flux about such opening with substantially zero net flux about the other opening. This relation is best achieved by having the openings at right angles to each other. Also, it is preferred that there be no magnetic material between the openings at their crossing since such material decreases the signal output. In the preferred form of FIG. 1, the openings intersect but are offset from each other so that there is no magnetic material between the openings but there is a maximum of open space at the intersection for passage of conductors. Any magnetic material exhibiting two residual flux states will be suitable for use in the block; however, material with a "square" hysteresis loop is preferred. Pressed ferrite materials are presently being used with production blocks being in the order of 50 x 50 x 80 thousandths of an inch.

A current pulse on the conductor 23 will set up a flux about the opening 21. A current in the direction of the arrow of FIG. 1 will produce a flux in the path shown by the arrows 27. Similarly, a current in the conductor 24 will produce a flux in the path 28. When the current pulses on the conductors 23, 24 are coincident, a net flux linking both openings is established, as shown by the arrows 29.

FIG. 2 illustrates the condition when the current is one of the conductors, here the bit current conductor 24, is of the opposite polarity. The net flux linking both openings is switched to the path indicated by the arrows 30. When there is a net residual flux linking both openings as shown in FIG. 1 or in FIG. 2, a subsequent current in only one of the openings leaves only a flux about the one opening with zero net flux about the other opening, assuming equal cross-sectional areas of the magnetic material in the flux paths at the four corners of the block. This removal or decay of flux about the other opening induces a voltage on the conductor through the other opening, the polarity of which is a function of the position of the residual flux which previously linked both openings. As seen in FIG. 3, a current on the conductor 23 in the direction shown results in a flux in the path 31 and a collapse of the flux which previously linked the conductor 24. This collapsing flux induces a voltage pulse on the conductor 24.

Figure 4:
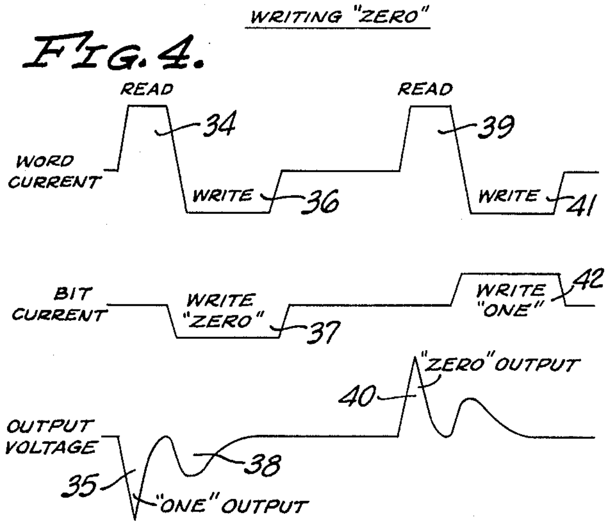
FIG. 4 is a diagram illustrating the waveform of the current and voltage pulses of the memory element of FIGS. 1, 2 and 3.

The memory element provides for storage of a binary bit and has an output that is bipolar in nature. The operation is described in conjunction with the diagram of FIG. 4. It is assumed that the element is initially in the condition of FIG. 1 with a residual flux in the path 29 linking both openings. A subsequent read current pulse 34 on the conductor 23 changes the block to the condition of FIG. 3 with the residual flux 29 eliminated, producing a voltage pulse 35 on the conductor 24, which is identified as a "one" output. Subsequently, a current pulse 36 on the conductor 23 and a current pulse 37 on the conductor 24 are produced concurrently to store a "zero" in the element, leaving a net residual flux linking both openings in the path 30, as shown in FIG. 2. The flux change about the bit opening 22 during the writing operation induces a voltage pulse 38 on the conductor in the opening 22. Ordinarily, the output amplifier will be gated off or its output ignored during the writing cycle in the conventional manner.

A subsequent read current pulse 39 again converts the element to the condition of FIG. 3, producing an output voltage pulse 40 opposite in polarity to the pulse 35, indicating a "zero" output. Then a "one" may be stored in the element by coincidence of a word write current pulse 41 and a bit write current pulse 42. Alternatively, a "zero" may again be stored in the element as previously described, the polarity or sense of the stored information being a function of the polarity of the bit write current pulse. The amplitude of the output signal will be dependent on the amplitude and duration of the word and bit current pulses and is preferably made to be of equal amplitude and opposite polarity for the "one" and "zero" outputs. It should be noted that the magnetic material does not have to be operated at saturation levels since only a portion of the available flux need be utilized in writing and reading, which is readily achieved by limiting the amplitude and/or duration of the writing currents. This permits operation at higher speeds and with lower power requirements as well as lower losses and heat rise. A third storage state may also be obtained with the memory element. Omission of the bit current pulse during writing results in a net residual flux about the opening 21, and hence no flux change about the opening 22 and no output during reading.

Figure 5:
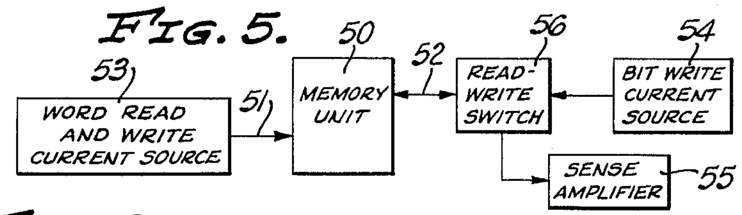
FIGS. 5 and 6 are block diagrams illustrating various embodiments of the invention.

Variations of the wiring arrangement shown in FIGS. 1, 2, and 3 may be utilized. A conductor may be threaded through an opening one or more times as desired, with an increase in the number of turns resulting in a decrease in the current required to provide the desired magnetization. Separate conductors may be used for reading and writing in either or both openings if desired. FIG. 5 is a block diagram illustrating a system suitable for operating a memory unit 50 having a single word opening conductor 51 and a single bit opening conductor 52. A word read and write current source 53 is connected to the conductor 51. A bit write current source 54 and an output or sense amplifier 55 are selectively connected to the conductor 52 through a read-write switch 56, which may be a true switching circuit or merely a diode decoupling network.

Figure 6:
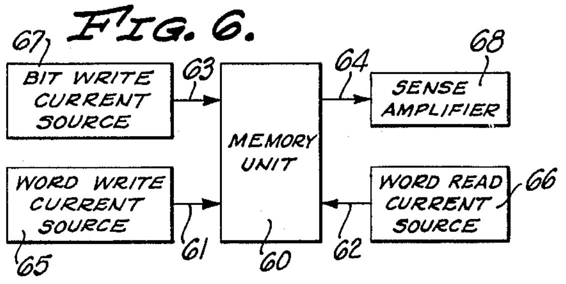

An alternative arrangement is shown in FIG. 6 including a memory unit 60 having conductors 61, 62 in the word opening and conductors 63, 64 in the bit opening. A word write current source 65 is connected to the conductor 61 and a word read current source 66 is connected to the conductor 62. A bit write current source 67 is connected to the conductor 63 and a sense amplifier 68 is connected to the conductor 64.

Figures 7, 8, 9:
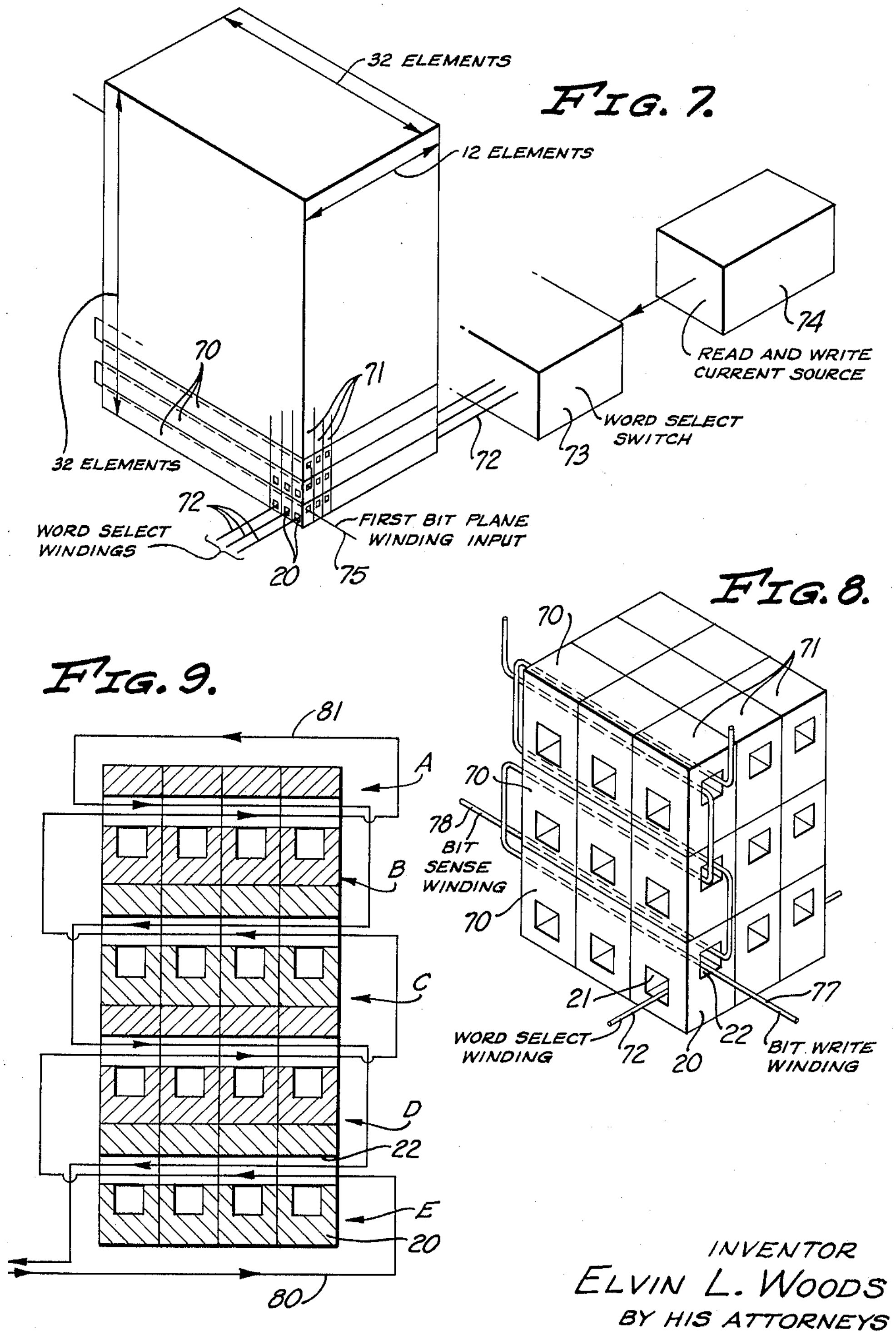
FIG. 7 is an isometric view of a preferred form of memory array.
FIG. 8 is an enlarged view of a portion of the array of FIG. 7 showing an alternate form of wiring for the bit openings.
FIGS. 9, 10, and 11 are sectional views through portions of an array showing other alternative wiring arrangements.

A plurality of the memory elements may be wired in an array to provide a memory system such as that shown in FIG. 7. A plurality of the magnetic blocks or units 20 are arranged in rows 70, which may be referred to as bit rows, with the bit openings of each block of a row aligned and with the rows disposed parallel to each other to form planes 71 of cores, usually referred to as bit planes. A plurality of the bit planes are arranged parallel to each other with the word openings of corresponding cores in each plane aligned. The cores may be positioned in contact with each other as shown in FIG. 7. An array comprising 1024 twelve bit data words can be provided by using thirty-two cores in a bit row, thirty-two bit rows in a bit plane, and twelve bit planes. Using the 50 x 50 x 80 thousandths inch elements, the total array requires a space of approximately 1.6 x 2.5 x 0.6 inches.

Such an array is easily and quickly wired. A conductor 72 is positioned in the aligned word openings of each word for carrying the word write and read currents. These straight-through conductors may be connected to a word select switch 73 which is energized from a read and write current source 74. The word select switch 73 may be actuated by a conventional addressing system to select a particular word in the array for storage of information or for reading of information. A single winding for each bit plane of the word oriented array is provided in the form of a conductor 75 positioned in the aligned bit openings of a bit row and doubled back through the aligned bit openings of the next row of the plane and so on in a serpentine fashion to thread each core of the bit plane. Similar conductors are provided for each bit plane.

The array of FIG. 7 provides a one element per bit memory which may be made of any size to have the desired storage capacity. Significantly, no space is required between the individual memory elements for wiring considerations.

The array of FIG. 7 utilizes a single conductor in the word openings and a single conductor in the bit openings. An alternative arrangement for the bit opening winding is shown in FIG. 8, which shows a portion of the array of FIG. 7 on a larger scale. A single conductor 72 is used in the word opening. A conductor 77 is threaded through the bit openings of a bit plane in the same manner as the conductor 75 of FIG. 7 for carrying the bit write current. A second conductor 78 is threaded through the bit openings of the plane in the serpentine fashion to function as the sense or output winding. The conductors 77, 78 may follow the same path, or may alternate as shown in FIG. 8, or may follow other winding patterns such as are described below.

The memory system as illustrated in FIGS. 7 and 8 has several significant advantages. The flux change as represented by an induced voltage on a word select winding is independent of the combination of stored "ones" and "zeros" making up the word. Hence this winding has a fixed impedance for reading and writing, simplifying driving amplifier requirements, especially for long word lengths and magnetic word select switches. Relatively large bit write disturb currents may be tolerated without loss of sense of stored "ones" and "zeros." These features are of extreme importance in the larger arrays which may have a thousand or more word capacity.

The read currents are disposed orthogonally to the sense or output conductors thus substantially minimizing electrostatic and eliminating electromagnetic coupling between the relatively large read currents and the output conductors.

In certain applications, other variations of the bit plane winding may be utilized. One such variation is shown in FIG. 9 which is a section through a bit plane comprising four bit rows of four cores per row. A single winding is illustrated, which may function as the bit write winding or the output winding or both. A conductor 80 is threaded through the rows of bit openings in the serpentine fashion, looped over the end of the bit plane at 81, and again threaded through the rows of bit openings in the serpentine fashion to provide a two-turn winding in each core. This extremely simple winding also minimizes the effects of stray fields as the winding loops indicated at B and D balance the winding loops at A, C and E. A termination impedance may be connected in the conductor at 81 to substantially eliminate voltage reflections with the winding functioning in the nature of a transmission line.

Figure 10:
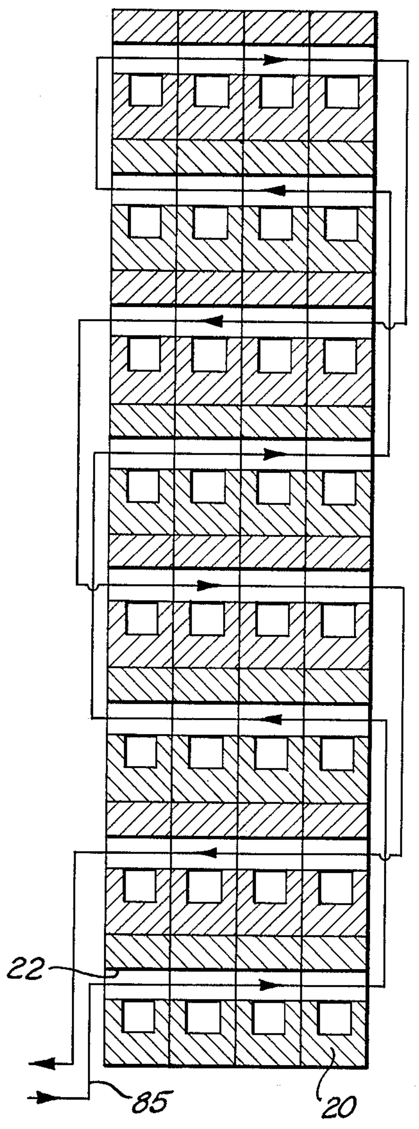

FIG. 10 illustrates another form of bit opening winding which may be used for the bit write conductor or for the sense conductor. The figure illustrates a sectional view through a 4 x 8 core bit plane. A conductor 85 is threaded through the bit openings of the first row of cores, the next row is skipped, and the conductor is threaded back through the next row, continuing through the plane in the serpentine fashion to the opposite end. Then the conductor continues back through the plane in the serpentine fashion through the previously skipped rows.

The winding of FIG. 10 may be used for one of the bit write and sense conductors with the winding of FIG. 9 used for the other conductor. Such a winding provides zero net element magnetic coupling between the sense and bit windings. The induced voltages due to bit write currents are in series opposition for each half of a total number of cores on each winding. Hence substantially no induced voltages resulting from element coupling are coupled to the sense amplifier conductor during rise and decay of the bit write current permitting very fast read after write systems and large arrays without severe sense amplifier recovery problems.

Figure 11:
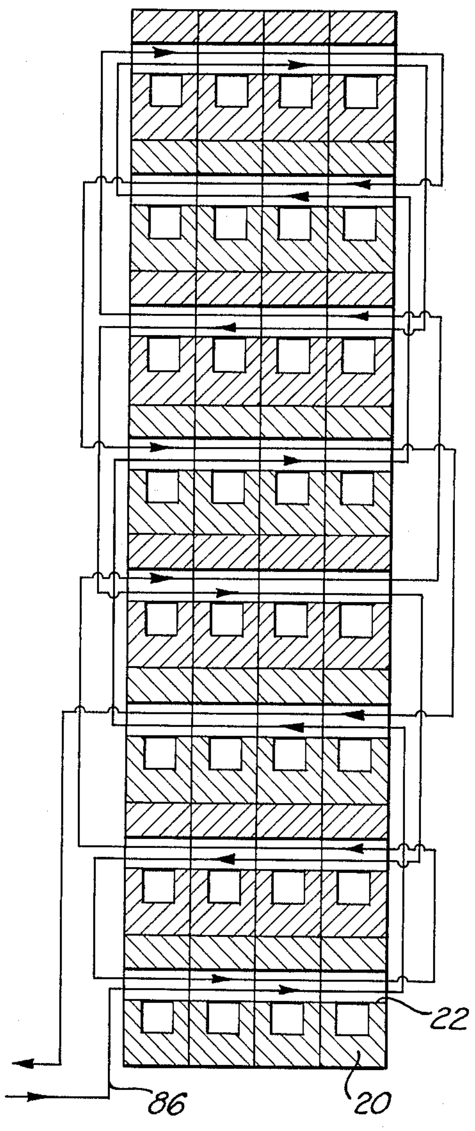

An alternative form of the winding of FIG. 10 for a two-turn winding is shown in FIG. 11. A conductor 86 is threaded through the rows in the same fashion as the conductor 85 of FIG. 10 passing in a first directional normal to the rows through one set of rows and then in the opposite direction through the other set of rows. Then the conductor 86 is again threaded through the rows in the first direction and returned, passing through the second set of rows while progressing in the first direction and through the first set of rows while progressing in the second direction.

In some applications of the memory system, shielding and/or heat stabilization and equalization between cores or groups of cores may be desired This is easily accomplished by inserting plates of appropriate material between the planes of cores. The plates may be arranged along one, two or all three planes and are appropriately apertured for passage of conductors therethrough.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

I claim as my invention:

1. In a magnetic memory element having a bipolar output, the combination of:

a block of magnetic material having first and second nonparallel openings therethrough, with substantially no magnetic material between said openings, and with said openings disposed relative to each other to provide a separate flux path about each opening not coupling the other opening and two alternate flux paths each about both openings and sharing common magnetic material with said separate paths;

means for producing concurrent write current pulses of predetermined polarities in said first and second openings to produce a net residual magnetic flux in a selected one of said alternate paths corresponding to the bit of information being stored;

means for producing a read current pulse in said first opening of opposite polarity to the first opening write current pulse to cancel the alternate path residual flux and produce a residual magnetic flux in the separate flux path about said first opening and flux change in the separate flux path about said second opening with the flux changing in a first direction when the residual flux was in one of said alternate paths and changing in the opposite direction when the residual flux was in the other of said alternate paths;

and means for detecting flux changes occurring about said second opening during said read current pulse with the polarity of flux change corresponding to the stored information.

2. In a magnetic memory element having a bipolar output, the combination of:

a block of magnetic material having first and second nonparallel openings therethrough, with substantially no magnetic material between said openings and with said openings disposed relative to each other such that a current through an opening produces a flux about such opening and substantially zero net flux about the other opening;

means for producing concurrent write current pulses of predetermined polarities in said first and second openings to produce a net residual magnetic flux in a path coupling both of said openings;

means for producing a read current pulse in said first opening of opposite polarity to the first opening write current pulse to cancel said residual flux and produce another residual magnetic flux about said first opening and flux change about said second opening;

and means for detecting flux change occurring about said second opening during said read current pulse with the polarity of flux change identifying the stored information.

3. In a magnetic memory element having a bipolar output, the combination of:

a unitary block of magnetic material having first and second intersecting, orthogonally disposed openings therethrough;

means for producing concurrent write current pulses of predetermined polarity in said first and second openings to produce a net residual magnetic flux in a path coupling both of said openings;

means for producing a read current pulse in said first opening of opposite polarity to the first opening write current pulse to cancel said residual flux and produce another residual magnetic flux about said first opening and flux change about said second opening;

and means for detecting flux change occurring about said second opening during said read current pulse with the polarity of flux change identifying the stored information.

4. An apparatus as defined in claim 3 including a first conductor in said first opening for said first opening write and read current pulses and a second conductor in said second opening for said second opening write current pulse and for generation of a voltage pulse thereon resulting from flux change about said second opening.

5. An apparatus as defined in claim 3 including a first conductor in said second opening for said second opening write current pulse and a second conductor in said second opening for generation of a voltage pulse thereon resulting from flux change about said second opening.

6. In a magnetic memory element having a bipolar output, the combination of:

a block of magnetic material having first and second intersecting, orthogonally disposed openings therethrough providing separate flux paths of substantially equal cross-sectional areas about each opening not coupling the other opening and two alternate flux paths about both openings and sharing common magnetic material with said separate paths;

means for producing coincident write current pulses of predetermined polarities in said first and second openings to produce a net residual magnetic flux in a selected one of said alternate paths corresponding to the bit of information being stored;

means for producing a read current pulse in said first opening of opposite polarity to the first opening write current pulse to cancel the alternate path residual flux and produce a residual magnetic flux in the separate flux paths about said first opening and substantially zero flux in the separate flux paths about said second opening with the flux changing in a first direction when the residual flux was in one of said alternate paths and changing in the opposite direction when the residual flux was in the other of said alternate paths;

and means for detecting flux change occurring about said second opening during said read current pulse with the polarity of flux change corresponding to the stored information.

7. A method of storing and extracting information in a block of magnetic material having first and second nonparallel flux paths which share common path portions in aiding and subtracting relation, and having third and fourth nonparallel flux paths which intersect each other and which share common path portions with said first and second flux paths, with the information in binary form and having a bipolar output, including the steps of:

inducing concurrent flux pulses in said first and second paths to store a first residual flux in a selected one of said third and fourth paths, with the flux in said first path having a predetermined polarity and the flux in said second path having a polarity corresponding to the bit of information to be stored, and with the polarity of flux in said second path determining which of said third and fourth paths is selected for storage of said first residual flux;

then inducing a flux pulse in said first path to substantially cancel said first residual flux and store a second residual flux in said first path, with the flux in said first path having a polarity opposite to that of the preceding flux in said first path;

and generating an output voltage pulse with the decay of said first residual flux.

8. A method of storing and extracting information in a block of magnetic material having first and second nonparallel flux paths which share common path portions in aiding and subtracting relation, and having third and fourth nonparallel flux paths which intersect each other and which share common path portions with said first and second flux paths, with the information and the output having three states, including the steps of:

inducing a flux pulse in said first path of a predetermined polarity;

coincidentally selectively inducing a flux pulse in said second path, with coincidence of flux pulses in said first and second paths storing a first residual flux in a selected one of said third and fourth paths corresponding to the first and second states, respectively, with the polarity of the flux in said second path determining which of said third and fourth paths is selected for storage of said first residual flux, and with an absence of flux in said first path resulting in a second residual flux in said first path corresponding to the third state;

then inducing a flux pulse in said first path to substantially cancel any first residual flux and store a third residual flux in said first path, with the flux in said first path having a polarity opposite to that of the preceding flux in said first path;

and generating an output voltage pulse with any decay of the first residual flux, with the polarity of such voltage pulse representing two of the states and the absence of a voltage pulse representing the third state.

9. In a word oriented one element per bit binary memory system having a bipolar output, the combination of:

a plurality of magnetic units, each comprising a block of magnetic material having intersecting, orthogonally disposed word and bit openings therethrough, with said blocks arranged in a plurality of bit rows with the bit openings of the blocks of a row aligned with the bit rows disposed parallel to each other to form a plurality of bit planes and with the bit planes arranged adjacent each other to form an array with the word openings of corresponding blocks of each plane aligned to define a word composed of a plurality of bits;

a plurality of word conductors, with a word conductor positioned in the aligned word openings of each word respectively;

means for generating word write and read current pulses of opposite polarities on word conductors in selected aligned word openings;

a plurality of bit conductors, with a bit conductor threaded through the bit openings of the blocks of each bit plane respectively;

means for generating bit write current pulses of a polarity corresponding to the information to be stored, on each of said bit conductors concurrent with the word write current pulse of the selected word to store a binary word in the array;

and means for determining flux change occurring about each bit opening of a word during a word read current pulse.

10. In a word oriented one element per bit binary memory system having a bipolar output, the combination of:

a plurality of magnetic units, each comprising a block of magnetic material having intersecting, orthogonally disposed word and bit openings therethrough, with said blocks arranged in a plurality of bit rows with the bit openings of the blocks of a row aligned and with the bit rows disposed parallel to each other to form a plurality of bit planes and with the bit planes arranged adjacent each other to form an array with the word openings of corresponding blocks of each plane aligned to define a word composed of a plurality of bits;

a plurality of word conductors, with a word conductor positioned in the aligned word openings of each word respectively;

means for generating word write and read current current pulses of opposite polarities on word conductors in selected aligned word openings;

a plurality of first bit conductors, with a first bit conductor threaded in a serpentine pattern through the bit openings of the rows of blocks of each bit plane respectively;

means for generating bit write current pulses of a polarity corresponding to the information to be stored, on each of said first bit conductors concurrent with the word write current pulse of the selected word to store a binary word in the array;

and a plurality of second bit conductors, with a second bit conductor threaded in a serpentine pattern through the bit openings of the rows of blocks of each bit plane respectively for generation of a voltage pulse thereon by flux change occurring about each bit opening of a word during a word read current pulse.

11. In a word oriented one element per bit binary memory system having a bipolar output, the combination of:

a plurality of magnetic units, each comprising a block of magnetic material having intersecting, orthogonally disposed word and bit openings therethrough, with said blocks arranged in a plurality of bit rows with the bit openings of the blocks of a row aligned and with the bit rows disposed parallel to each other to form a plurality of bit planes and with the bit planes arranged adjacent each other to form an array with the word openings of corresponding blocks of each plane aligned to define a word composed of a plurality of bits, with blocks contacting adjacent blocks along these mutually perpendicular planes;

a plurality of word conductors, with a word conductor positioned in the aligned word openings of each word respectively;

means for generating word write and read current pulses of opposite polarities on word conductors in selected aligned word openings;

a plurality of bit conductors, with a bit conductor threaded through the bit openings of the blocks of each bit plane respectively;

means for generating bit write current pulses of a polarity corresponding to the information to be stored on each of said bit conductors concurrent with the word write current pulse of the selected word to store a binary word in the array;

and means for determining flux change occurring about each bit opening of a word during a word read current pulse.

References Cited by the Examiner

Pages 40–54, Aug. 31, 1959—Publication I: "Biax High Speed Magnetic Computer Element," by C. L. Wanlass and S. D. Wanlass, IRE—Wescon Convention Record, vol. 3, part 4.

IRVING L. SRAGOW, *Primary Examiner.*

R. J. McCLOSKEY, A. I. NEUSTADT, *Assistant Examiners.*